Jan. 17, 1950 E. MAYER ET AL 2,494,955
RESETTABLE REGISTER
Filed Jan. 27, 1945
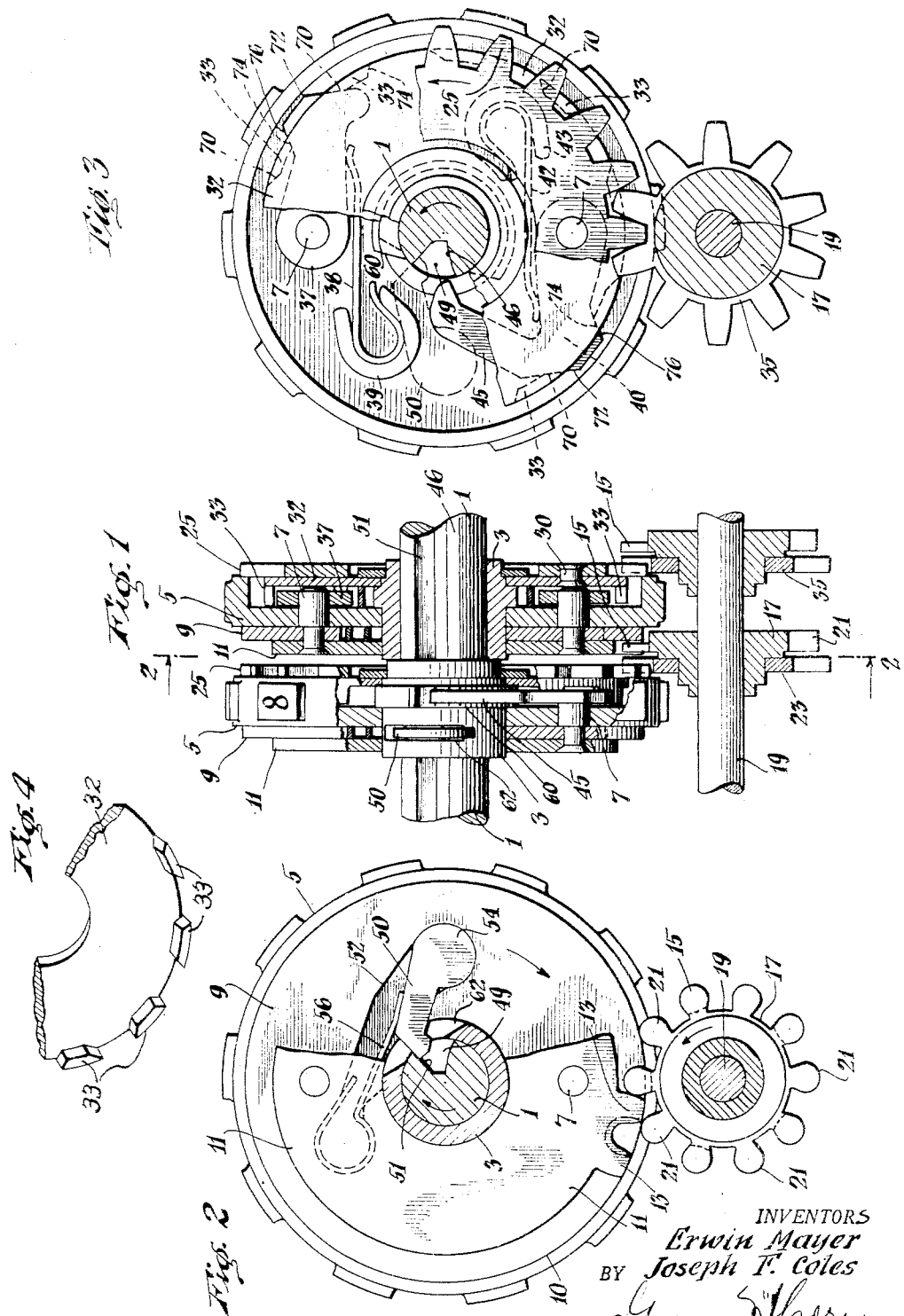
INVENTORS
Erwin Mayer
Joseph T. Coles
BY
George H. Corey
ATTORNEY Patented Jan. 17, 1950

2,494,955

UNITED STATES PATENT OFFICE 2,494,955

RESETTABLE REGISTER

Erwin Mayer, Corona, and Joseph F. Coles, Valley Stream, N. Y., assignors to Neptune Meter Company, a corporation of New Jersey Application January 27, 1945, Serial No. 574,958

11 Claims. (Cl. 235—131)

1

This invention relates to registers or counters of the type which are resettable after integrating movement to register a metered quantity. The invention particularly relates to registers or counters having a plurality of numeral wheels of which usually at least one wheel registers units of measurement and the others in successive order register decimal multiples of such units.

It is customary to assemble a plurality of numeral wheels on a common reset shaft so as to be rotatable relative to said shaft. During the registering operation this shaft is held stationary. Each wheel is arranged adjacent to a gear, also rotatable on and relative to said reset shaft, driven by the transfer gear of a Geneva transfer movement, said driven gear being rotatable on said shaft relative to said numeral wheel. Each numeral wheel also is provided with the usual locking disc and two-toothed gear for transmitting through the transfer gear rotation from one numeral wheel to the driven gear associated with the numeral wheel of next higher order. To effect the rotation of the numeral wheel with which a driven gear is associated, a pair of pawls ordinarily are carried on the driven gear and engage a ratchet formed as part of or attached to said numeral wheel to receive the impelling action of the pawls.

In devices of this character after completion of the integration of a given measurement, for example after the measurement of a fluid such as gasoline dispensed through a meter and a dispensing pump, resetting of the register may be accomplished by turning the reset shaft by hand or by power means forwardly in the integrating direction until all of the numeral wheels again reach the zero position. A suitable reset pawl is provided and is arranged to rotate with each numeral wheel and to be engaged by a ratchet or similar pawl engaging part formed in or rotating with the reset shaft. The reset pawl is arranged to be cammed out of engagement with the reset ratchet in the forward or integrating rotation of the wheels, but is brought into engagement with this reset ratchet upon rotation of the reset shaft so as to drive the numeral wheels forwardly to accomplish resetting.

In such a construction, because of the action of the Geneva movement, each numeral wheel of higher order will be given a fraction of a revolution, usually one tenth, forwardly ahead of the rotation imparted by the reset shaft each time a wheel of next lower order completes a revolution. This brings about a momentary increment of speed of the higher order numeral wheels in the

2 resetting operation once in each revolution thereof. This action as well as the relatively high speed at which the resetting operation may be carried out frequently produces "overthrow" or uncontrolled movement of the numeral wheels ahead of the rotation of the reset shaft. Especially when the reset shaft is stopped after resetting rotation, the inertia of the numeral wheels may continue their rotation.

A numeral wheel which has so run ahead may be prevented from falling back to its proper relation to the other wheels because the pawl by means of which it receives the drive from the driven gear in the registering operation may drop into the next or a succeeding tooth or depression in the ratchet associated with said numeral wheel. Thus upon completion of the rotation of a wheel of given order to zero position, a wheel or wheels of higher order may not indicate zero but may register integer quantities as if registering a measurement. As these wheels are out of step with the other wheels the resetting operation must be continued at proper speed to insure that all wheels return to zero. This causes delay. If the integer registration on wheels is not noticed error may occur in registering the next measurement. In registering apparatus utilizing automatic reset it may be impossible or inconvenient to continue rotation of the reset shaft or otherwise to bring about reset of all wheels to the zero position. Any such extraordinary resetting operation requires special attention by the operator.

It is an object of the invention to provide a register or counter in which overthrow of the numeral wheels is prevented.

It is another object of the invention to provide a register having numeral wheels which may be assembled in the ordinary manner in relation to the reset shaft and to the driven gear while providing means for preventing overthrow.

It is a further object of the invention to provide in combination with the ordinary reset shaft and the numeral wheels and driven gears mounted thereon a drive between each driven gear and its associated numeral wheel which accomplishes integrating rotation of the wheels but provides means for locking the wheels to the reset shaft when they tend to "overthrow."

It is a still further object of the invention to provide a ratchet and a cooperating pawl between the driven gear and the numeral wheel driven thereby which will so act as to tend to preserve the driving relation during the integrating or registering operation but which during resetting will cooperate to effect interlock of the wheel with the reset shaft when the wheel tends to run ahead of this shaft.

The several features of the invention will be more fully understood by reference to the drawings taken in connection with the description to follow, in which:

Fig. 1 represents, partly in section and partly in elevation, an assembly of two numeral wheels on a reset shaft together with the transfer movement, certain parts being broken away for better illustration;

Fig. 2 represents a section at line 2—2 of Fig. 1 with certain of the parts omitted;

Fig. 3 represents an end view from the right hand side of Fig. 1 with certain of the parts broken away to reveal the locking device of the invention; and Fig. 4 is a fragmentary perspective view of the ratchet which is associated with the numeral wheel in the Figs. 1 and 3.

In the particular embodiment illustrated in the drawings, upon reset shaft 1 are mounted the sleeves 3 rotatable upon and relative to said shaft. Said sleeves each are formed with suitable shoulders respectively to receive on one portion of their length the numeral wheels 5, each wheel 5 being fastened to a sleeve. To each of these wheels is fastened by means of riveted pins 7 a locking disc 9 and a two-toothed gear 11 having teeth 13 meshing with teeth 15 of the transfer gear 17 mounted to rotate upon and relative to transfer shaft 19. Said transfer gear 17 in the usual manner is provided with wide face teeth 21, alternating with the narrow face teeth 15, the teeth 21 bearing upon the peripheral surface 10 of locking disc 9 as this disc rotates to lock the transfer gear 17 and the pinion 23 fastened thereon against rotation as shown in Fig. 2. It will be understood from the drawing that in the particular embodiment illustrated the transfer gear 17 has ten teeth and is rotated one-fifth of a revolution when driven by the movement of the two-toothed gear from one locking position to the next. The pinion 23 and the gear 17 are fastened together to rotate on and relative to shaft 19. Thus pinion 23 has ten teeth meshing with the 20-tooth gear 25 associated with the next numeral wheel 5. Said next numeral wheel 5 thereby is given one-tenth of a revolution for each revolution of the first numeral wheel 5 through the action of a pawl and ratchet which will now be described.

A disc 32 is attached by means of rivets 30 to the face of the gear 25. In the embodiment illustrated this disc carries on the peripheral edge thereof and projecting laterally toward the numeral wheel 5 with which the gear 25 is associated ten ratchet teeth 33 spaced equally about the periphery of the disc 32. It will be apparent that, as the transfer pinion 23, or the similar transfer pinion 35, in a registering operation of the device is rotated to rotate the gear 25 in the direction of the arrow in Fig. 3, the ratchet disc 32 also will be rotated upon the reset shaft 1.

The pin 7 extends through the numeral wheel 5 toward the disc 32. Pivotally mounted on said extension is pawl 37 engaging the ratchet teeth 33 in the manner shown at the upper portions of Fig. 3. The pawl 37 is biased to said engagement by spring 38 formed to be retained in a recess provided by curved walls 39 which may be molded or otherwise formed in or fastened to the numeral wheel 5. The pawl 37 thus moves with the numeral wheel as it rotates. The gear 25 therefore drives through the ratchet 33 and the pawl 37 to effect rotation of the wheel 5 in integrating direction. The pawl 37 and ratchet teeth 33, however, are so formed that when the wheel 5 is rotated forwardly, that is in the direction of the arrow in Fig. 3, while the ratchet teeth are held stationary, the pawl 37 is cammed by ratchet teeth 33 out of engagement with said ratchet teeth. After pawl 37 passes a tooth 33, however, it is moved by spring 38 into the next notch or space between the ratchet teeth. This camming action occurs when the gear 25 and, therefore, the ratchet disc 32 are held stationary, as during the resetting operation.

A pawl 40 functioning in the same manner as pawl 37 is shown at the lower portion of the numeral wheel in Fig. 3. Pawl 40 is biased to engagement with ratchet teeth 33 by spring 42 held in a recess provided by walls 43 molded or otherwise formed in or fastened to the wheel 5 as are walls 39. This pawl 40 is provided with a locking hook 45 extending inwardly toward shaft 1 from the outer end of the pawl 40 but formed so as to run clear of the reset shaft 1 when the ratchet and numeral wheel rotate together in the direction of the arrow, that is when the gear 25, rotating with ratchet disc 32, by engagement of the ratchet teeth 33 with pawls 37 and 40 effects driving movement of the wheel 5 in the direction of the arrow to effect integration or registering movement of the register.

The hook 45 of pawl 40 is formed to cooperate with a recess or spline groove 49 in the reset shaft 1. The wall surface 46 of the groove 49 and the end of the hook 45 are so formed with respect to the radial direction from said hook to the axis of the shaft 1 that rotation of the wheel in the direction of the arrow (Fig. 3) will cause the hook, if moved into said groove, to bear upon the wall surface 46 with a pressure generally normal to said radial direction, thus tending to pull the shaft 1 rotatably with the numeral wheel 5, that is, stated conversely, to prevent rotation of the wheel 5 ahead of rotation of the shaft 1. The hook 45 of the pawl 40 is moved into such engagement with the wall 46 of the spline groove 49 whenever the pawl 40 is cammed out of engagement with the ratchet teeth 33 from the position shown in the drawing. This camming action occurs whenever a wheel 5 carrying pawl 40 therewith rotates forwardly, that is, in integrating direction relative to the ratchet disc 32 and the gear 25 which is riveted thereto. When the numeral wheel 5 is so rotated in said direction by the reset shaft, as hereafter described, the pawl 40 will be cammed out of engagement in passing each tooth 33 of the numeral wheel and then will be returned to engagement by the spring 42. The hook 45 will enter and recede from the groove 49 in each such camming movement of the pawl 40.

To effect rotation of the wheel 5 upon rotation of the reset shaft 1 as shown in Fig. 2, a pawl or detent 50 is pivotally supported in a suitably formed recess 52 cut in the locking disc 9 and is held against lateral displacement between the face of the wheel 5 and the disc 11 of the two-toothed gear. The pawl or detent 50 is pivotally movable at its circular portion 54 which fits within a circular portion of recess 52 and is biased toward the shaft 1 by spring 56 held in a part of the recess 52 which is suitably formed to receive said spring. The pawl 50 is formed at its end to engage the wall 51 of the spline groove 49 in the reset shaft 1. This wall 51 and the end surface of the pawl 50 extend generally in a radial direction so that upon rotation of the reset shaft 1 in the direction of the arrow in Fig. 2 the shaft drives through the pawl 50 to rotate the numeral wheel 5 and the locking disc 9 fastened thereto. It will be noted that the pawl or detent 50 and the spline groove 49 are so formed that upon normal integrating rotation of the wheel 5 in the registering operation the pawl 50 may cam out of the spline groove 49 thus permitting the wheel 5 and the sleeve 3 on which it is mounted to rotate relative to said reset shaft 1. Upon resetting rotation of the shaft 1, however, in the direction of the arrow the pawl 50 drops into the groove 49 to effect driving of the wheel 5 within one revolution of said shaft 1. During any part revolution prior to said engagement of pawl 50 with groove 49 no rotation of the wheel 5 occurs and pawls 37 and 40 remain in engagement with teeth 33 in the manner above described. The camming of pawls 37 and 40 and engagement of hook 45 with groove 49 occur as soon as wheel 5 is moved by the reset shaft.

In order that the hook 45 and the end of pawl 50 may have access to and enter the spline groove 49, slots 60 and 62 are formed in each sleeve 3. The slots also respectively retain the hook 45 and the pawl 50. The end of the hook 45 of pawl 40 may move in slot 60 toward the shaft 1 when the pawl 40 is urged inwardly under the camming action of the teeth 33 of the ratchet. The end of the pawl 50 may move inwardly in slot 62 under the pressure of the spring 56. As above described, the pawl 40 is biased outwardly so that the hook 45 thereof is held out of the spline groove 49, with the end of the hook clear of the shaft 1, while the pawl 40 is in engagement with the ratchet 33. The end of the pawl 50 will enter the spline groove 49 once in each revolution of the numeral wheel but will ride on the shaft 1 as the numeral wheel is rotated thereon.

The contact surfaces of the ratchet teeth 33, as above mentioned, are so formed as to effect driving relation with respect to the pawls 37 and 40 when the ratchet disc 32 is rotated in the direction of the arrow in Fig. 3. To this end the contact surfaces 70 of the ratchet teeth and the coacting surfaces 72 of the pawls 37 and 40 are formed at such an angle with respect to the lengthwise extent of the pawl and with respect to the axis of the shaft 1 and to the pivot pins 7 that the pawls 37 and 40 tend to be urged into frictional engagement with the ratchet teeth 33. The surfaces 70 and 72 when in contact may be almost but not exactly parallel to the radius drawn from the axis of shaft 1 to the pins 7. The angle is such however, that the surface 72 of the pawl may be released from the surface 70 of the ratchet tooth 33 without binding under camming action of said ratchet teeth.

The surface 74 of the ratchet tooth 33 and the corresponding surface 76 of the pawl is at such an angle that these pawls are readily cammed inwardly toward shaft 1 when the pawls are drawn ahead of the ratchet teeth 33 by rotation of the wheel 5 relative to the ratchet disc 32. As the pressure provided by the springs 38 and 42 is aided by the action of the surfaces 70 and 72, these springs need not have great strength to insure return of the pawls 37 and 40 into engagement with the ratchet teeth 33 and to insure holding the pawl surface 72 in contact with the ratchet tooth surface 70 until driving pressure is exerted between them upon rotating disc 32. The camming action effected between surfaces 74 and 76 thus may take place without great resistance by the springs 38 and 42. The parts, therefore, which are intended to move relative to each other may easily do so in the normal action of integrating registration and of resetting. The invention provides, however, for preventing overthrow or the running of any numeral wheel ahead of its proper resetting rotation.

We claim:

1. In a resettable register having a reset shaft, a numeral wheel and a gear driven by the transfer gear of a Geneva movement, said wheel and said driven gear both being rotatable on and relative to said shaft and rotatable thereon relative to each other, the combination with ratchet means operatively connecting said driven gear and wheel to transmit drive from said gear to said wheel during registering operation of said register and with detent means connecting said shaft to said wheel to transmit drive from said shaft to said wheel during resetting operation of said register, of means actuatable by said ratchet means during resetting rotation of said shaft and wheel to connect said shaft to said wheel to prevent forward rotation of said wheel ahead of said resetting rotation of said shaft.

2. In a resettable register having a reset shaft, a numeral wheel and a gear driven by the transfer gear of a Geneva movement, said wheel and driven gear both being rotatable on and relative to said shaft and rotatable thereon relative to each other, in combination with a ratchet wheel rotating about said shaft concomitantly with said driven gear and a pawl revolvable about said shaft concomitantly with said numeral wheel, said ratchet wheel and pawl operatively connecting said driven gear and said numeral wheel for transmitting drive from said driven gear to said numeral wheel in registering operation of said register, and in combination with a part adapted to be engaged by a pawl and rotating concomitantly with said shaft and a second pawl adapted to engage said part and revolvable about said shaft concomitantly with said numeral wheel, said pawl engaging part and said second pawl operatively connecting said shaft and said numeral wheel for transmitting drive to said wheel from said shaft in resetting operation thereof, means actuatable by said ratchet wheel upon resetting rotation of said shaft to engage said pawl engaging part so as to connect said shaft to said numeral wheel to prevent forward rotation of said wheel ahead of said resetting rotation of said shaft.

3. In a resettable register having a reset shaft, a numeral wheel and a gear driven by the transfer gear of a Geneva movement, said wheel and said driven gear both being rotatable on and relative to said shaft and rotatable thereon relative to each other, ratchet means mounted to rotate on and relative to said shaft concomitantly with said driven gear, a pawl for engaging said ratchet means pivotally supported on means revolvable about said shaft concomitantly with said numeral wheel, means to bias said pawl to engagement with said ratchet means, a part adapted to be engaged by a pawl and rotating concomitantly with said reset shaft, a reset pawl pivotally supported on means revolvable about said shaft concomitantly with said numeral wheel for engaging said pawl engaging part to drive said numeral wheel upon resetting rotation of said reset shaft, means to bias said reset pawl to engage said pawl engaging part, an overthrow pawl pivotally supported on means revolvable about said shaft concomitantly with said numeral wheel for engaging said ratchet means and actuated thereby to pivotal movement upon rotation of said numeral wheel relative to said ratchet means, and means actuated by said overthrow pawl for engaging said pawl engaging part upon such pivotal movement of said overthrow pawl to prevent relative movement of said reset shaft and said numeral wheel during said reset operation.

4. In a resettable register having a reset shaft, a numeral wheel and a gear driven by the transfer gear of a Geneva movement, said wheel and said driven gear both being rotatable on and relative to said shaft and rotatable thereon relative to each other, ratchet means peripherally disposed about and attached to said driven gear, a pawl for engaging said ratchet means to receive driving movement from said ratchet means and said gear and pivotally supported on said numeral wheel to revolve about said shaft therewith, means to bias said pawl to engage said ratchet means, said shaft having a spline depression therein, a reset pawl pivotally supported on said numeral wheel for engaging said depression to receive driving movement from said reset shaft, means to bias said reset pawl to engage said depression to rotate said numeral wheel with said shaft upon resetting rotation of said shaft, an overthrow pawl pivotally supported on said numeral wheel and actuated by said ratchet means to move pivotally upon rotation of said numeral wheel relative to said ratchet means, and means to bias said overthrow pawl to engage said ratchet means, said overthrow pawl being formed with a portion for engaging said spline depression upon such pivotal movement thereof to prevent relative movement of said reset shaft and said numeral wheel.

5. In a resettable register having a reset shaft, a numeral wheel and a gear driven by the transfer gear of a Geneva movement, said wheel and said driven gear both being rotatable on and relative to said shaft and rotatable thereon relative to each other, ratchet means mounted to rotate on and relative to said shaft concomitantly with said driven gear, a pawl for engaging said ratchet means pivotally supported on means revolvable around said shaft concomitantly with said numeral wheel, the contact surfaces of said ratchet means and said pawl being formed and arranged with respect to the axis of said shaft and with respect to said pivot of said pawl so as to urge said pawl out of said engagement upon resetting rotation of said wheel and of said pawl supporting means in the integrating direction relative to said ratchet means, and means actuated by said pawl in its pivotal movement out of said engagement for locking said pawl to said reset shaft as it is rotated in the resetting operation to prevent rotation of said wheel relative thereto.

6. In a resettable register having a reset shaft, a numeral wheel and a gear driven by the transfer gear of a Geneva movement, said wheel and said driven gear both being rotatable on and relative to said shaft and rotatable thereon relative to each other, ratchet means mounted to rotate on and relative to said shaft concomitantly with said driven gear, a pawl for engaging said ratchet means pivotally supported on means revolvable around said shaft concomitantly with said numeral wheel, means to bias said pawl to engagement with said ratchet means, the contact surfaces of said ratchet means and said pawl being formed and arranged with respect to the axis of said shaft and to said pivot of said pawl so as to urge said pawl into frictional contact with said ratchet means upon driving rotation of said ratchet means to effect integrating rotation of said wheel and to urge said pawl out of said engagement against said bias means upon rotation of said pawl supporting means and said wheel in the integrating direction relative to said ratchet means, a part adapted to be engaged by a pawl and rotating concomitantly with said reset shaft, a reset pawl pivotally supported on means revolvable about said shaft concomitantly with said numeral wheel for engaging said pawl engaging part to drive said numeral wheel in integrating direction only upon resetting rotation of said reset shaft, means to bias said reset pawl to engage said pawl engaging part, said first pawl being provided with a portion for engaging said pawl engaging part upon said pivotal movement thereof to prevent rotation of said numeral wheel in the integrating direction ahead of said reset shaft.

7. In combination with a resettable register numeral wheel and a gear asociated therewith to be driven by the transfer gear of a Geneva movement, each of said parts being mounted for rotation in integrating direction during registering operation on and relative to a reset shaft, said wheel being rotatable relative to said gear during resetting operation and having means for receiving driving movement in integrating direction only from said shaft on resetting rotation thereof, means for effecting a driving connection from said gear to said wheel on registering rotation of said gear and permitting said rotation of said wheel relative to said gear upon resetting rotation of said shaft and wheel, and means actuated by said driving connection means for effecting engagement of said wheel with said shaft to prevent rotation of said wheel ahead of said shaft in resetting rotation thereof.

8. In combination with a resettable register numeral wheel and a gear associated therewith to be driven by the transfer gear of a Geneva movement, each of said parts being mounted for rotation in integrating direction during registering operation on and relative to a reset shaft, said wheel being rotatable relative to said gear during resetting operation and having means for receiving driving movement in integrating direction only from said shaft on resetting rotation of said shaft, ratchet means between said gear and wheel for transmitting driving movement from said gear to said wheel in integrating direction only and releasing said wheel to rotate relative to said gear upon resetting movement of said shaft and wheel, said ratchet means including a device actuated upon integrating rotation of said wheel relative to said gear during resetting operation for locking said wheel to said reset shaft to prevent said wheel from so rotating ahead of said shaft.

9. In a resettable register, the combination with a reset shaft, a numeral wheel mounted to rotate on and relative to said reset shaft, and means for effecting resetting rotation of said wheel upon rotation of said shaft, of auxiliary means operatively connected to said wheel and actuated during resetting rotation of said shaft and of said wheel to engage said shaft and connect it to said wheel to prevent said wheel from rotating ahead of said shaft.

10. In a resettable register, the combination with a reset shaft, a numeral wheel mounted to rotate on and relative to said reset shaft, and means for effecting resetting rotation of said wheel upon rotation of said shaft, of auxiliary means operatively connected to said wheel and actuated in response to resetting rotation of said shaft and said wheel upon rotation of said wheel ahead of said shaft to connect said wheel to said shaft to keep said wheel moving in unison with said shaft throughout a resetting operation.

11. In a resettable register, the combination with a reset shaft, a numeral wheel mounted to rotate on and relative to said reset shaft, and means actuated upon rotation of said shaft in a resetting direction to establish a driving connection between said shaft and said numeral wheel but ineffective to prevent rotation of said wheel in the resetting direction ahead of said shaft, of means for preventing said numeral wheel from rotating ahead of said shaft during resetting, said means including a ratchet wheel mounted adjacent said numeral wheel, a pawl operatively engaging said ratchet wheel and supported to be rotatable concomitantly with said numeral wheel in its resetting rotation, and means cooperating with said ratchet wheel and with said pawl and effective upon said operative engagement thereof to establish an interconnection between said numeral wheel and said shaft to prevent said wheel from rotating ahead of said shaft during resetting operation.

ERWIN MAYER.
JOSEPH F. COLES.

REFERENCES CITED

The following references are of record in the file of this patent:

UNITED STATES PATENTS

| Number | Name | Date |
|---|---|---|
| 2,358,780 | Vroom | Sept. 26, 1944 |
| 2,382,708 | Graydon, Jr., et al. | Aug. 14, 1945 |